Patented Dec. 18, 1945

2,391,139

UNITED STATES PATENT OFFICE 2,391,139

PROCESS FOR ALKYLATING ARYLAMINES

Joseph B. Dickey, Rochester, N. Y., and James G. McNally, Knoxville, Tenn., assignors to Eastman Kodak Company, Rochester, N. Y., a corporation of New Jersey No Drawing. Application December 15, 1943, Serial No. 514,424

3 Claims. (Cl. 260—283)

This invention relates to the alkylation of arylamines, and more particularly to the catalytic alkylation of arylamines.

The N-alkylation of aryl amines by means by means of alcohols or ethers in the presence of certain catalysts is shown in U. S. Patent 2,017,051 of Arnold and Williams, U. S. Patents 2,017,069 of Lazier, and 2,073,671 of Andrews. The catalysts shown in these patents all require to be deposited on carriers: e. g., alumina on activated charcoal, or a phosphate on pumice. The preparation of such a catalyst mass necessarily involves expense and inconvenience.

We have discovered that boron trifluoride is an excellent catalyst for the N-alkylation of aryl amines by means of alcohols, ethers, or ether bases having a hydrogen attached to the ring nitrogen, e. g. tetrahydroquinoline, may be alkylated according to our invention.

The following examples are illustrative of the carrying out of our invention:

Example 1.—Aniline and ethyl alcohol are charged into a shaking autoclave and boron trifluoride is passed in until the desired amount is absorbed. The charge is heated and shaken for a number of hours, and then removed after cooling. The reaction product is extracted with dilute alkali, and fractionated. In addition to ethylaniline, diethylaniline and unreacted aniline, a small amount of high-boiling bases, boiling at 218–230° C., was obtained. In five experiments, the results were as follows:

| Gram-moles | | | Temp. | Time | Percent yield | | |
|---|---|---|---|---|---|---|---|
| Aniline | Ethyl alcohol | BF³ | | | Ethyl-aniline | Diethyl-aniline | Unreacted aniline |
| | | | ° C. | Hours | | | |
| 2 | 10 | 2.0 | 215 | 20 | 15 | 72 | 1 |
| 2 | 10 | 1.0 | 215 | 15 | 45 | 45 | 5 |
| 3 | 13 | 0.75 | 215 | 15 | 55 | 20 | 13 |
| 3 | 13 | 0.75 | 180 | 17 | 69 | 0 | 26 |
| 3 | 13 | 1.0 | 180 | 24 | 69 | 0 | 28 | alcohols. Boron trifluoride is a gas, and can be passed directly into the mixture of aryl amine and alcohol or ether in an autoclave. Alternatively, since boron trifluoride forms complexes with alcohols, ethers, or amines, the boron trifluoride can be passed into one of the starting materials before the latter is put into the autoclave.

Either primary or secondary amines may be alkylated. In the case of a primary amine, if dialkylation is desired, the proportion of alcohol or ether is increased. Raising the temperature above that necessary for N-alkylation may result in alkylation of the ring. For example, when aniline was reacted with ethyl ether in the presence of boron trifluoride to give ethylaniline and diethylaniline, it was noted that at temperatures around 215° C. some ethylation of the ring also took place.

When the monomethyl ether of ethylene glycol was employed as the alkylating agent, the principal products were methylaniline and dimethylaniline. Small amounts of β-hydroxyethylaniline, di-β-hydroxyethylaniline, β-methoxyethylaniline, and products boiling well above 325° C. were also formed.

In addition to aromatic amines, heterocyclic

It thus appears that while there is no correlation between the results and the amount of catalyst or the time of heating, formtaion of diethylaniline is favored by a high proportion of ethyl alcohol and inhibited by a low reaction temperature.

Example 2.—279 g. (3.0 g.-moles) of aniline, 384 g. (12.0 g.-moles) of methanol and 102 g. (1.5 g.-moles) of boron trifluoride were heated in a shaking autoclave for 16 hours at 215° C. A 52% yield of dimethyl aniline and a small amount of methylaniline were obtained. The rest of the aniline did not react.

Example 3.—93 g. (1.0 g.-mole) of aniline, 304 g. (4.0 g.-moles) of ethylene glycol monomethyl ether and 34 g. (0.5 mole) of boron trifluoride were heated in a shaking autoclave at 200–205° C. for 15 hours. The reaction product was worked up as in Example 1. A 60% yield of dimethylaniline was obtained, together with 10–15% of resin, small amounts of β-hydroxyethylaniline, di-β-hydroxyethylaniline, β-methoxyethylaniline, and di-β-methoxyethylaniline. 3% of unreacted aniline was recovered.

When the same process was carried out at a temperature of 165° C., no resin was formed, and a good yield of methyl and dimethylaniline was obtained, together with a small amount of mono-β-methoxyethylaniline. 5-10% of unreacted aniline was recovered.

*Example 4.*—1 g.-mole of aniline, 5 g.-moles of ethyl ether, and 0.5 mole of boron trifluoride were heated in a shaking autoclave at 215° for 16 hours. The reaction product was worked up as in Example 1, and there was obtained a 62% yield of ethylaniline, and a 25% yield of diethylaniline, together with 2% of unreacted aniline and a mixture of ethyl and diethylanilines containing one or more ethyl groups attached to the ring. By lowering the reaction temperature, the amount of this fraction was decreased.

*Example 5.*—1 g.-mole of ethylaniline, 3 g.-moles of methanol, and 0.2 g.-mole of boron trifluoride were heated in a shaking autoclave at 190° C. for 30 hours. An excellent yield of methylethylaniline was obtained.

*Example 6.*—1 g.-mole of aniline, 8 g.-moles of butyl alcohol, and 0.25 g.-mole of boron trifluoride were heated in a shaking autoclave at 180° C. for 48 hours. The reaction product was worked up as in Example 1 to give a good yield of butyl and dibutyl aniline.

Corresponding results were obtained with m-toluidine.

*Example 7.*—1 g.-mole of aniline, 0.25 g.-mole of boron trifluoride and 4 g.-moles of ethylene glycol were heated in a shaking autoclave at 180–190° for 18 hours. The reaction products were worked up as in Example 1 to give mono- and di-β-hydroxy-ethylaniline, together with smaller amounts of higher-boiling compounds.

In place of aniline we may use, for example, methyl aniline, o-, m- and p-toluidine, the halogenated anilines, nitroaniline, α-naphthylamine, p-aminobenzene sulfonamide, the xenylamines, aminofluorene, and the like, or we may use a heterocyclic base in which a hydrogen atom is attached to the ring nitrogen.

In place of the alkylating agents mentioned in the examples, we may employ, for example, propyl alcohol, pentanol, cyclohexanol, heptyl alcohol, lauryl alcohol, cetyl alcohol, β-phenyl ethanol, benzyl alcohol, diethylene glycol monoethyl ether, methylethyl ether, dipropyl ether, dibutyl ether, dimethyl ether, cyclohexylethyl ether, or the like.

Besides having the advantage of convenience in use, boron trifluoride can be purchased and is potentially very cheap. It is not poisoned by impurities, and can be readily recovered by means of calcium fluoride. (The mixture containing boron trifluoride is extracted with an aqueous suspension of calcium fluoride. The suspension is then concentrated by evaporation, and treated with sulfuric acid.)

Crude alcohols, ethers, and aromatic amines can be used when boron trifluoride is used as a catalyst, which is not the case with the catalysts of the prior art. Moreover, higher yields of alkylated amines are obtained than when the prior art catalysts are used. If desired, both the amino group and the aromatic ring can be alkylated.

What we claim as our invention and desire to be secured by Letters Patent of the United States is:

1. A process for the N-alkylation of a compound selected from the group consisting of aromatic amines having at least one hydrogen atom attached to the amino nitrogen, and heterocyclic bases containing a nitrogen atom in the ring and having a hydrogen atom attached to the ring nitrogen, which comprises heating this compound with a compound selected from the group consisting of alcohols, aliphatic and alicyclic ethers, and ether-alcohols, in the presence of boron trifluoride as a catalyst.

2. A process for the N-alkylation of an aromatic amine having at least one hydrogen atom attached to the amino nitrogen, which comprises heating the amine with a compound selected from the group consisting of alcohols, aliphatic and alicyclic ethers, and ether-alcohols, in the presence of boron trifluoride as a catalyst.

3. A process for the N-alkylation of a heterocyclic base containing a nitrogen atom in the ring and having a hydrogen atom attached to the ring nitrogen, which comprises heating the heterocyclic base with a compound selected from the group consisting of alcohols, aliphatic and alicyclic ethers, and ether-alcohols, in the presence of boron trifluoride as a catalyst.

JOSEPH B. DICKEY.
JAMES G. McNALLY.